(12) United States Patent
Wilson (10) Patent No.: US 10,663,149 B2
(45) Date of Patent: May 26, 2020

(54) SHINGLE CLAMP

(71) Applicant: Jacob Justus Wilson, Lubbock, TX (US)

(72) Inventor: Jacob Justus Wilson, Lubbock, TX (US)

( * ) Notice: Subject to any disclaimer, the term of this patent is extended or adjusted under 35 U.S.C. 154(b) by 0 days.

(21) Appl. No.: 15/881,876

(22) Filed: Jan. 29, 2018

(65) Prior Publication Data

US 2018/0231221 A1   Aug. 16, 2018

Related U.S. Application Data

(60) Provisional application No. 62/459,230, filed on Feb. 15, 2017.

(51) Int. Cl.
| | |
|---|---|
| *F21V 21/088* | (2006.01) |
| *F16B 2/00* | (2006.01) |
| *F16B 2/22* | (2006.01) |
| *F16M 13/02* | (2006.01) |
| *F21S 4/10* | (2016.01) |
| *F21V 21/08* | (2006.01) |
| *F16B 2/10* | (2006.01) |

(Continued)

(52) U.S. Cl.
CPC ............ *F21V 21/088* (2013.01); *F16B 2/005* (2013.01); *F16B 2/22* (2013.01); *F16M 13/022* (2013.01); *F16M 13/027* (2013.01); *F21S 4/10* (2016.01); *F21V 21/0832* (2013.01); *F16B 2/10* (2013.01); *F16B 45/00* (2013.01); *F21W 2131/107* (2013.01)

(58) Field of Classification Search
CPC .... F16B 2/005; F16B 2/10; F16B 2/22; F16B 45/00; F16M 13/022; F16M 13/027; F21S 4/10; F21V 21/088; F21W 2131/107
See application file for complete search history.

(56) References Cited

U.S. PATENT DOCUMENTS

| | | | | |
|---|---|---|---|---|
| 836,838 | A * | 11/1906 | Shay ....................... | A41F 11/02 24/515 |
| 2,526,810 | A * | 10/1950 | Curtis ..................... | D06F 55/02 24/343 |

(Continued)

OTHER PUBLICATIONS

Palmer Pad Elevated Protection Pad Clamps (http://www.palmerpads.com/products/hanging-solutions/clamps/).

*Primary Examiner* — Robert Sandy
*Assistant Examiner* — David M Upchurch
(74) *Attorney, Agent, or Firm* — Robert P. Greenspoon; Flachsbart & Greenspoon LLC (57) ABSTRACT

Described is a clamp that is useful for attaching a decorative item (for example, a Christmas light string) to surfaces such as roofs, shingles, drop ceilings, and other objects. The clamp comprises at one end, a clamp portion having a top part and a bottom part held together by a fastener, cooperating together to fasten the clamp portion to a fixed object, and at an opposite end, a hook portion having a hook for securing to a decorative item. Pressure is applied to a top and bottom part of the clamp portion to open the clamp portion. The hook portion comprises an opening that is opened by applying pressure to an end of the hook so as to allow a portion of the decorative item to be inserted into the hook, and hooks to the decorative item in the manner of which the hook is closed 360 degrees.

14 Claims, 12 Drawing Sheets

(51) Int. Cl.
*F16B 45/00* (2006.01)
*F21W 131/107* (2006.01)

(56) References Cited

U.S. PATENT DOCUMENTS

| | | | | |
|---|---|---|---|---|
| 2,543,108 A * | 2/1951 | Helwig | ................ | A47G 25/481 |
| | | | | 223/96 |
| 3,131,449 A * | 5/1964 | Chiyoichi | ............... | D06F 55/02 |
| | | | | 24/334 |
| 4,005,510 A * | 2/1977 | Noda | ........................ | A41F 3/02 |
| | | | | 24/504 |
| 4,169,549 A * | 10/1979 | Takagi | ................ | A47G 25/483 |
| | | | | 223/96 |
| 4,489,466 A * | 12/1984 | Bakker | ..................... | A41F 3/02 |
| | | | | 24/489 |
| 5,165,147 A * | 11/1992 | Kuo | ........................ | D06F 55/02 |
| | | | | 24/346 |
| 5,457,857 A * | 10/1995 | Lam | ........................ | B21D 1/145 |
| | | | | 24/503 |
| 5,566,058 A | 10/1996 | Protz, Jr. | | |
| 5,732,921 A * | 3/1998 | Lemire | ................ | A47F 5/0006 |
| | | | | 24/515 |
| 6,416,028 B1 * | 7/2002 | Miller | ................ | B66B 11/0253 |
| | | | | 187/414 |
| 7,621,486 B1 * | 11/2009 | Barrepski | ............... | F16L 3/127 |
| | | | | 248/228.7 |
| 7,963,490 B2 | 6/2011 | Pritchard | | |
| 8,756,771 B1 * | 6/2014 | Moreau | ..................... | F16B 2/10 |
| | | | | 24/517 |
| 9,657,894 B2 * | 5/2017 | Gibbons | ................ | F16B 2/22 |
| D799,314 S * | 10/2017 | Adams, IV | ..................... | D8/395 |
| 10,180,242 B2 * | 1/2019 | Schreiber | ............. | F21V 21/088 |
| 2007/0223221 A1 * | 9/2007 | George | ................ | F21V 21/088 |
| | | | | 362/249.01 |

\* cited by examiner

SHINGLE CLAMP

This application claims the benefit of U.S. Provisional Application No. 62/459,230, filed Feb. 15, 2017.

TECHNICAL FIELD OF THE INVENTION

The present invention relates generally to a device for use in combination with decorations for celebrations and festivals, including holiday decorations and lighting decorations.

BACKGROUND OF THE INVENTION

The present invention is a clamping device that prevents decorations for Christmas or decorations for other festive events from falling or being detached from a fixed object. The present invention attaches to surfaces, roofs, ceilings, shingles or other objects with a clamp, and attaches to light strings or other decorations with a hook.

There are many devices and prior art known to be used for Christmas lights and decorations. However these devices do not contain the unique structural features, functions, and benefits of the present invention.

For example, U.S. Pat. No. 5,566,058 A discloses a light clip for shingles or gutters. The light clip described by the '058 patent is a light clip for holding a light bulb with an attachment portion for removably mounting the light clip to a support surface such as a shingle or gutter without putting holes in the gutters or shingles. '058 Abstract. The attachment portion (element 25 in the '058 patent) includes a body which includes a flat portion that extends horizontally having a distal chamfered end and a curved portion. '058 3:5-8. The bulb holder portion (element 45) includes a part circular portion which terminates into two outwardly extending portions and is connected to a substantially straight stem portion extending away from the circular portion. '058 3:28-31. The invention described by the '058 patent is structurally and functionally dissimilar to the present invention. Unlike the light clip disclosed by the '058 patent, the present invention is a clamp comprising a clamp portion having a top part and a bottom part held together by a fastener (such as a spring or slide lock), and which together cooperate to attach to a surface or fixed object, and a hook portion having a hook that secures to a decorative item. In addition to being structurally and functionally dissimilar, the present invention is easier to use than the light clip described by the '058 patent.

As another example, U.S. Pat. No. 7,963,490 B2 discloses a ridge clip. The ridge clip is used for attaching lights or other decorations to the ridge of a roof without compromising the seal on ridge shingles. '490 Abstract. The ridge clip includes a shingle hook that affixes to the overhanging portion of a shingle, and an extension arm that extends long enough to mount the decoration on the roof ridge. '490 Abstract. The ridge clip of the '490 patent is limited to roof ridges, whereas the present invention can fasten lighting or holiday ornaments anywhere along a fixed object via a clamp portion. The hook of the '490 patent mounts the clip to a shingle, whereas the hook portion of the present invention fastens to decorations. Moreover, the ridge clip does not have a top and bottom portion held together by a fastener (where the fastener can be a spring or slide lock). The ridge clip of the '490 patent is structurally and functionally dissimilar to the clamp disclosed by the present invention.

There are also prior art clamps that are used for other purposes other than securing decorative items. For example, the PALMER® ceiling clamp devices (http://www.palmer-pads.com/products/hanging-solutions/clamps/, last accessed Oct. 13, 2017) are used to secure an elevator pad to a drop ceiling while transporting items within the elevator that might damage the sides of the elevator. First, these clamps work in the opposite way from the clamp of the present invention. They work the opposite way, because the clamp portion clamps onto the item to be secured (the elevator pad) rather than the fixed object the item is to be secured to, and vice versa: because the hook portion is hooked to the fixed object (the ceiling) rather than the item to be secured (the elevator pad). Second, these clamps do not comprise a 360° hook. Because the present invention's hook is a 360° hook, the chances of the clamp being dislodged from either the shingle or from the decoration are much less. The present invention provides a more secure connection.

SUMMARY OF THE INVENTION

The present invention, "The Shingle Clamp", aids in the prevention of Christmas lights or decorations falling down or detaching from a fixed object. The clamp can be used with other devices or as a standalone device.

DETAILED DESCRIPTION OF INVENTION

The present invention is a clamp with a protruding arm with hook. In a preferred embodiment, the clamp is made of plastic, but the clamp can be made of any other durable or resilient material. In the preferred embodiment, the clamp is a plastic two-piece clamp with a fastener (e.g., a metal spring or slide lock) to hold firm to a shingle or other fixed object for displaying holiday decorations (for example, Christmas decorations or decorations for other celebrations or festive events). The clamp has a fastener (e.g., a metal spring slide lock) to lock the clamp in place to roofs or other fixed objects, and a hook for attaching to lights for holiday events like Christmas or for other events. The clamp prevents the lights and decorations from falling from shingles or other fixed objects.

Figure 1:
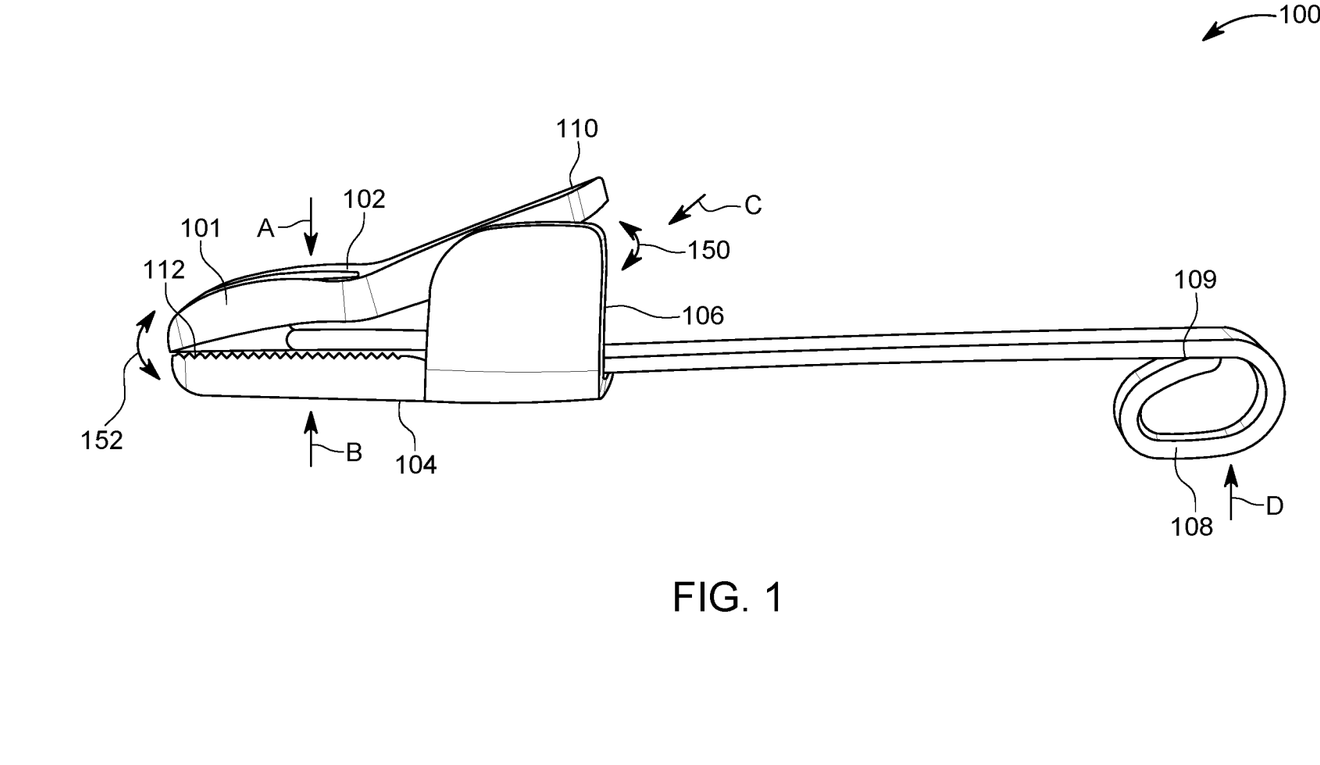
FIG. 1 is a side depiction of a first design of a shingle clamp.

FIG. 1 is a side depiction of a first design of The Shingle Clamp 100. Elements 102 (top part of clamp), 104 (bottom part of clamp), and 106 (spring or slide lock) cooperate to attach or fasten the clamp to a shingle or other surface or fixed object. Element 108 (hook) hooks to lights or decorations. The clamp secures lights or decorations to an object and prevents the lights or decorations from falling.

Shown in FIG. 1 is the clamp portion 101 including the top part of the clamp 102, the bottom part of the clamp 104, and a fastener 106. The fastener 106 can be a metal spring or a plastic slide lock. Also shown is the hook portion or hook 108. The top part of the clamp 102 and the bottom part of the clamp 104 cooperate with the fastener 106 to attach to a surface. To open the portion of the clamp 112 that is to be secured to a shingle or surface, the user will press down on the press part 110 of the top part 102 of the clamp. Rotating angles 150, 152 demonstrate how the clamp portion 101 rotates when it is opened 152 and how it rotates about the fastener 150.

The clamp 100 will clamp to shingles or other like objects used for displaying decorations. The clamp 100 provides safety since it prevents electrical lights and decorations from falling down. The clamp 100 hooks to decorations such that the resilient hook 108 is closed 360 degrees. The clamp 100 clamps together with one or more plastic parts 102 and 104 held together with a fastener 106. In one embodiment, the fastener 106 is a metal spring. Alternatively, the fastener 106 is a plastic slide lock. The hook 108 loops 360 degrees and in one embodiment is made of resilient plastic. The hook 108 contains an opening 109 that will bend and partially open to allow the hook to be secured to a light string or other decoration.

Figure 2:
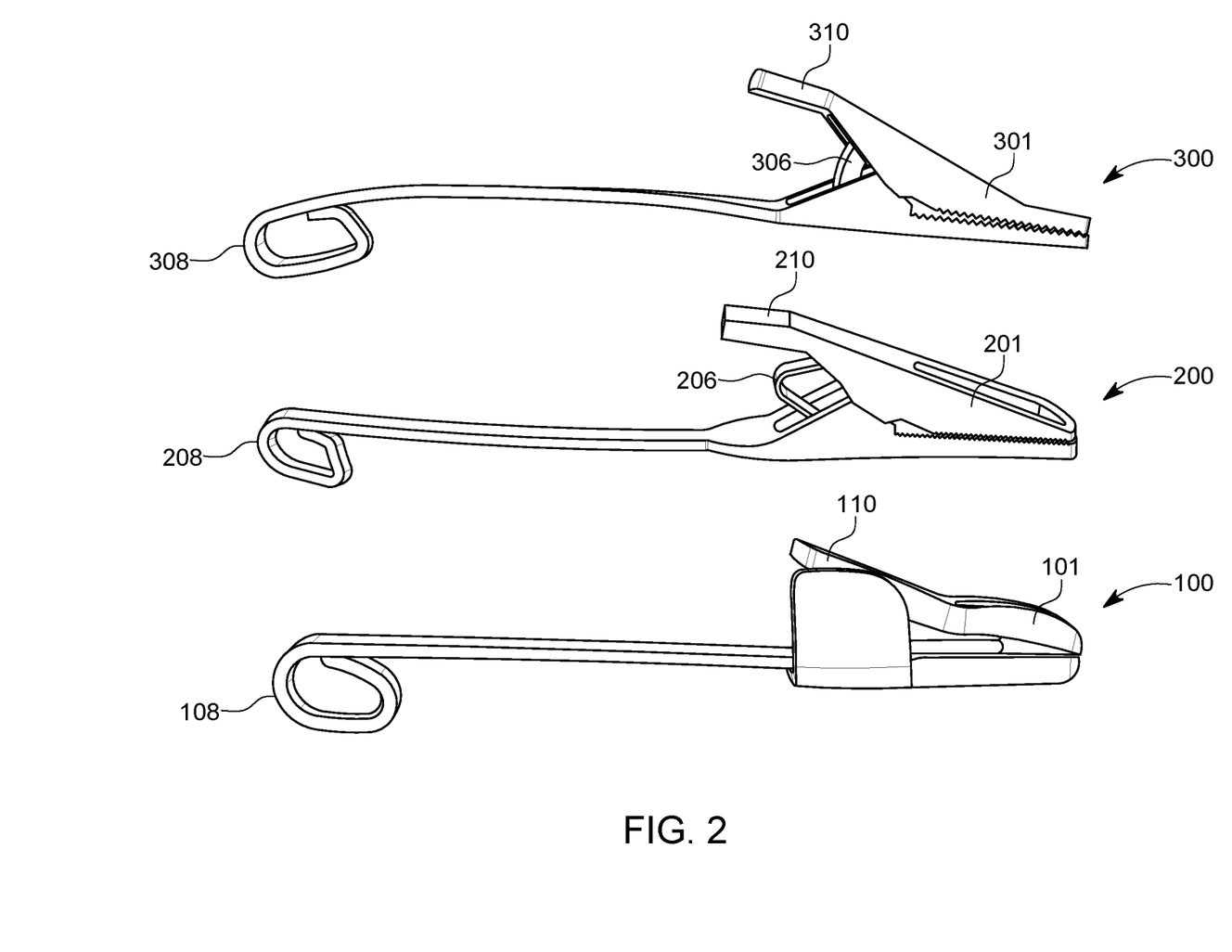
FIG. 2 shows three different designs of a shingle clamp.

FIG. 2 shows three different structures for a shingle clamp. Design 100 is the clamp depicted in FIG. 1. Design 200 has a metal spring as a fastener 206 while design 300 has a plastic slide lock as a fastener 306. The clamp and hook portions are shaped slightly differently for each of the three designs 100, 200, 300. Designs 200 and 300 each have press parts 210 and 310, respectively, that bend out at an angle to make is easier to press down on the top part of the clamp to open the clamp portion. In each of these designs, the shingle clamp 100/200/300 is about seven (7) inches long.

Figure 3:
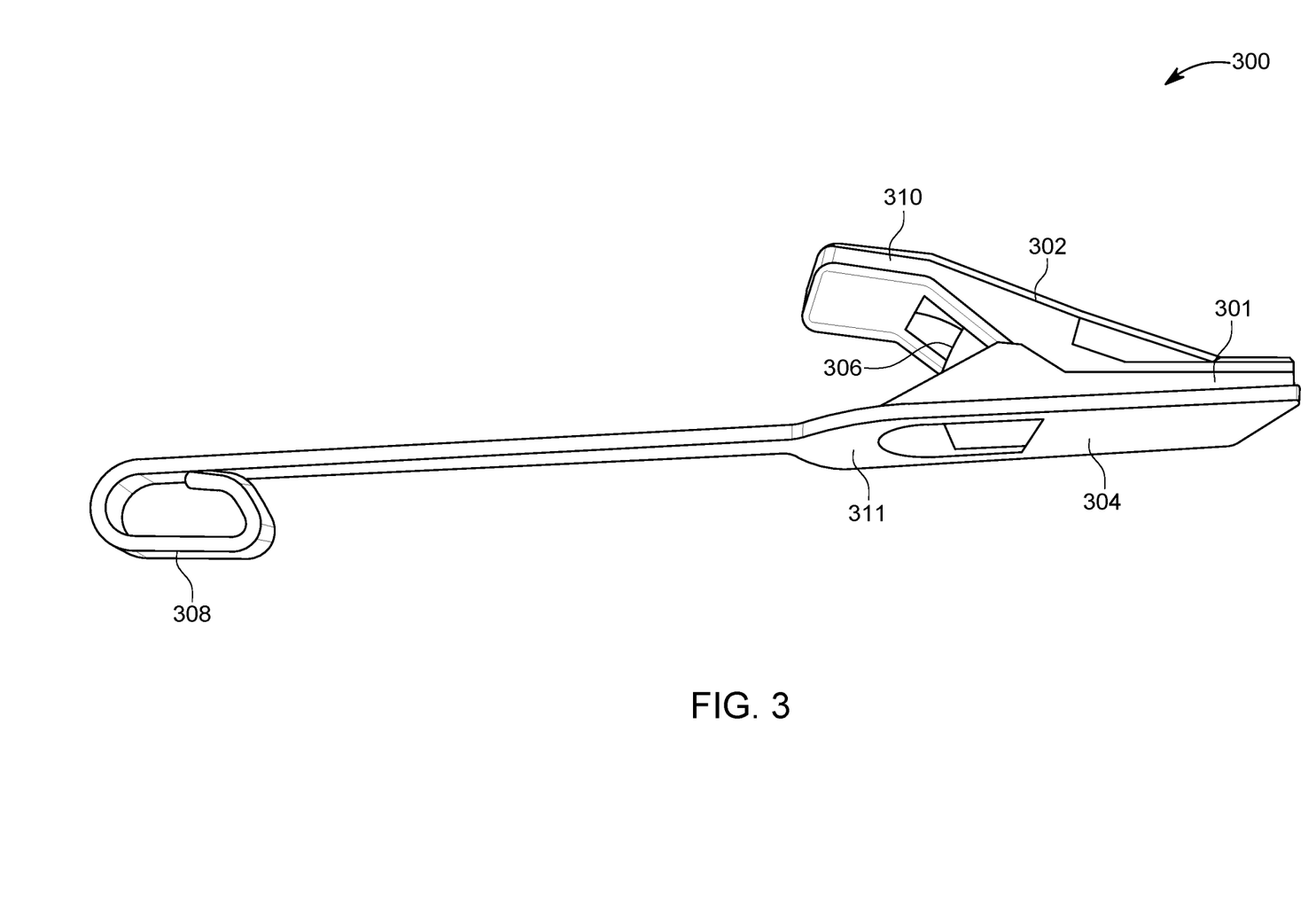
FIG. 3 is a perspective view of the third design of a shingle clamp.

FIG. 3 is a perspective view of the third design of a shingle clamp, showing the clamp portion 301, slide lock 306, top part 302, bottom part 304, top press part 310, bottom press part 311, and hook portion or hook 308.

Figure 4A:
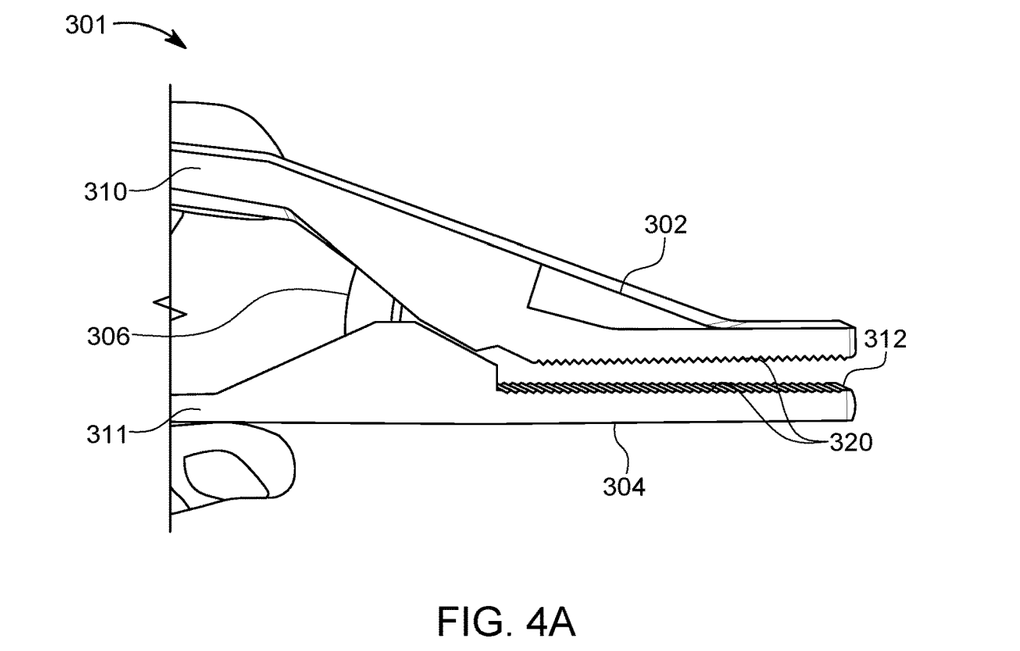
FIG. 4A shows the clamp portion of the third design of a shingle clamp being mildly depressed so as to open the clamp portion.

FIG. 4A shows the clamp portion 301 of the third design of the clamp being mildly depressed to open the clamp opening 312, by a person depressing the top press part 310 and bottom press part 311. When the person discontinues applying pressure to the top press part 310 and bottom press part 311, the tension of the slide lock 306 will cause the clamp opening 312 to close. Also shown are toothed ridges 320 of the clamp which help secure the clamp portion to a fixed object or shingle.

Figure 4B:
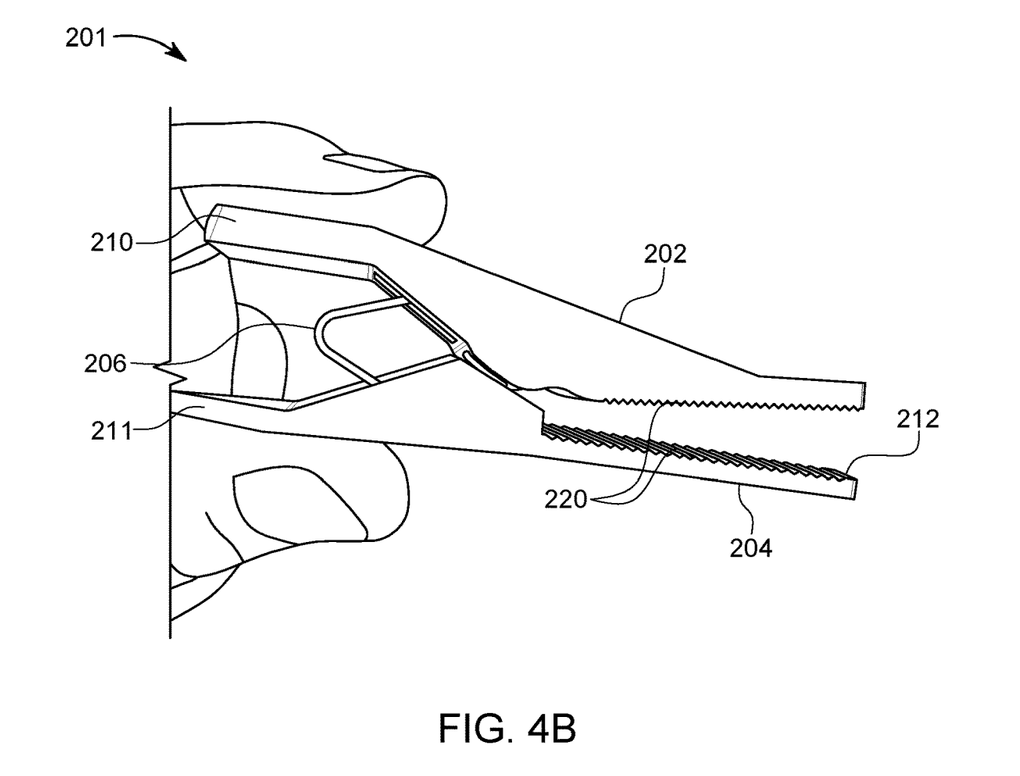
FIG. 4B shows the clamp portion of the second design of a shingle clamp being mildly depressed so as to open the clamp portion.

FIG. 4B shows the clamp portion 201 of the second design of the clamp being mildly depressed to open the clamp opening 212, by a person depressing the top press part 210 and bottom press part 211. Similarly, when the person discontinues applying pressure to the top press part 210 and bottom press part 211, the tension of the metal spring 206 will cause the clamp opening 212 to close. Also shown are toothed ridges 220 of the top 202 and bottom 204 portions of the clamp which help secure the clamp portion to the shingle.

Figure 5:
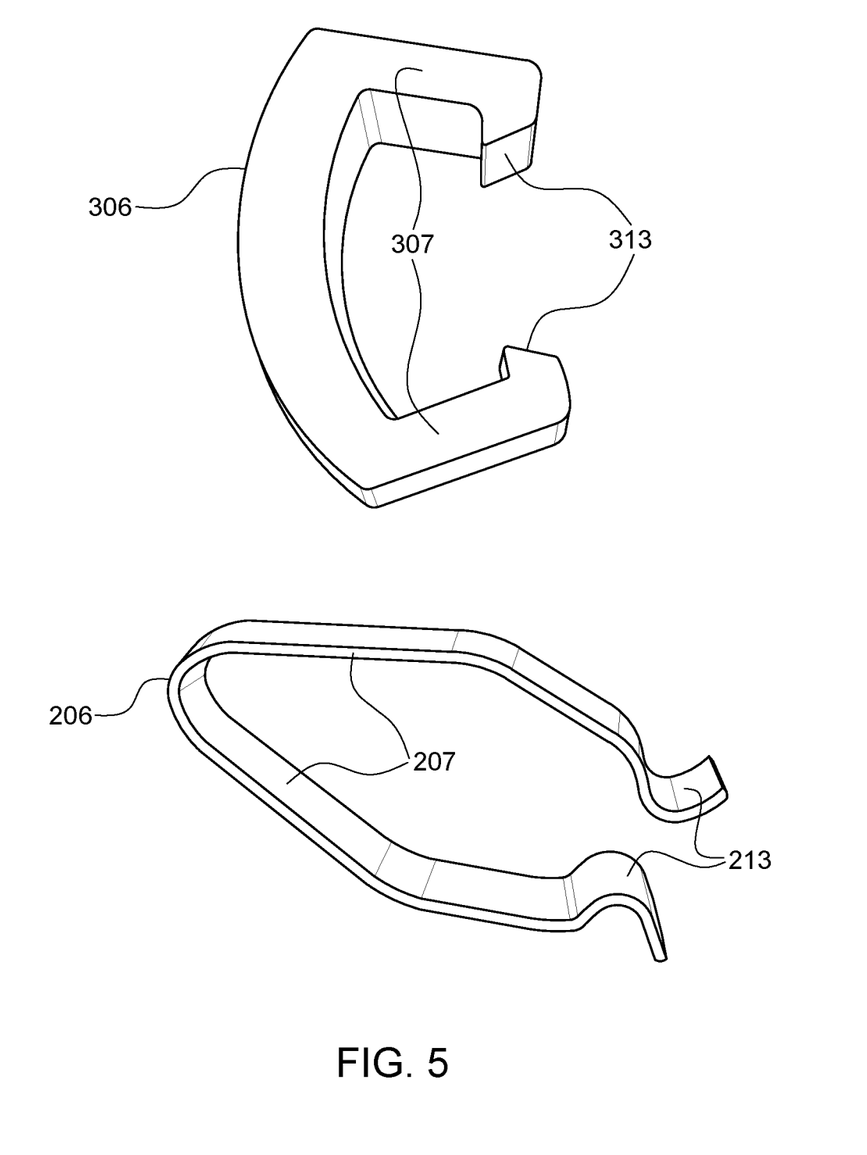
FIG. 5 depicts a plastic slide lock and a metal spring for the clamp portion of a shingle clamp.

FIG. 5 depicts a generally C-shaped plastic slide lock 306 and metal spring 206 for the clamp portion of the clamp. Each of the flexible arms 307/207 of the lock/spring has a memory that will cause them to remain in a rest position. Once the clamp is actuated by a person, the flexible arms 307/207 angle outward from their rest position, but when the person releases the tension, this will cause the flexible arms 307/207 to angle inward towards their rest position, closing the openings 312/212 of the clamp portion 301/201. At the ends of the flexible arms 307/207 are bent tips 313/213 which secure the lock/spring 306/206 to the top part 302/202 and bottom part 304/204 of the clamp portion 301/201.

Figure 6:
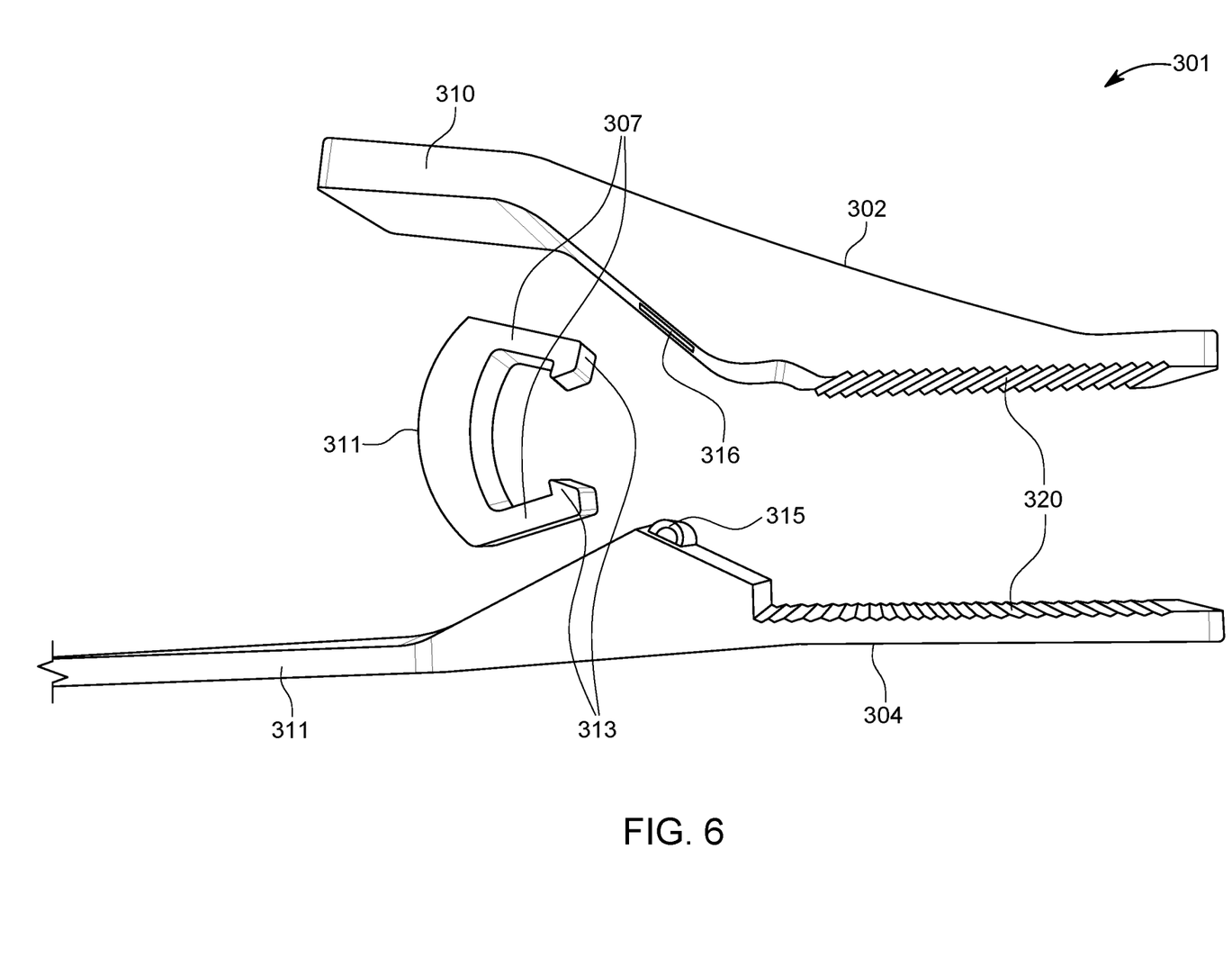
FIG. 6 is an exploded side view of the clamp portion of the third design of a shingle clamp.

FIG. 6 is an exploded side view of the clamp portion 301 of the third design of the clamp. In addition to all the other components, shown in the bottom part 304 of the clamp is a protruding member 315 which is inserted into a depressed area 316 of the top part 302 to connect together the top 302 and bottom part 304 of the clamp.

Figure 7:
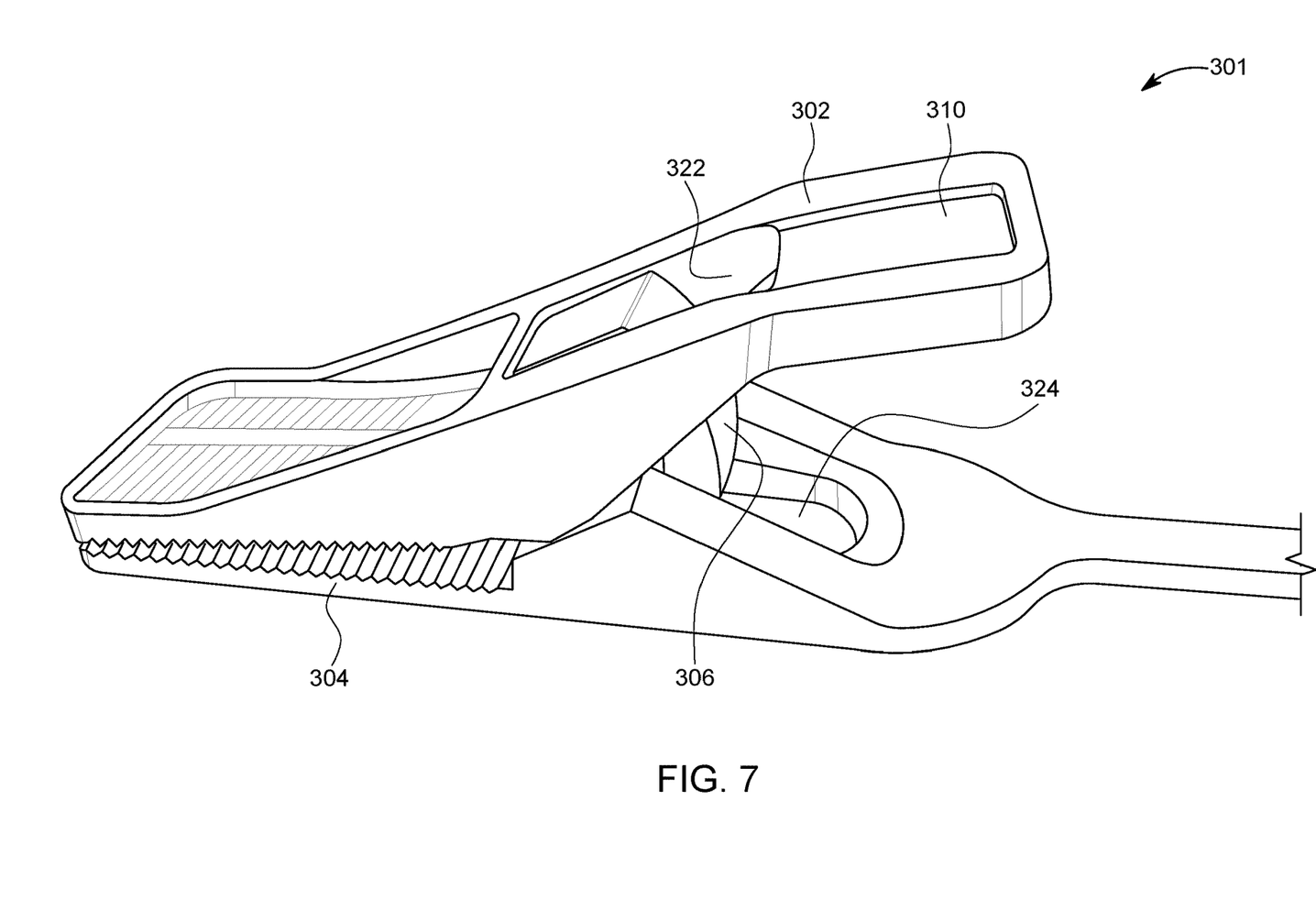
FIG. 7 is a perspective view of the clamp portion of the third design of a shingle clamp.
Figure 8:
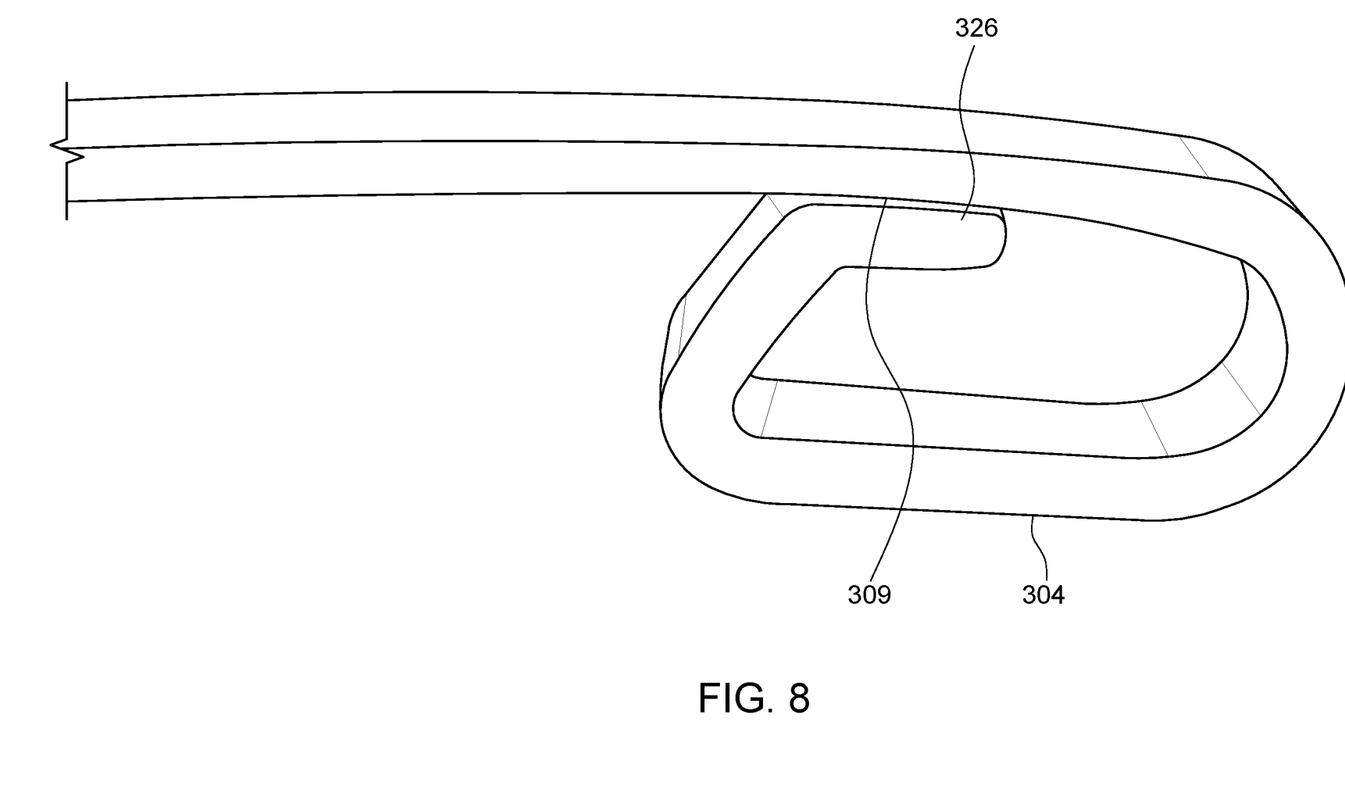
FIG. 8 is a close up view of the hook portion of the third design of a shingle clamp.

FIG. 7 is a perspective view of the clamp portion 301 of the third design of a shingle clamp. In addition to depicting various parts of the clamp, FIG. 8 shows apertures 322, 324 in the top 302 and bottom 304 parts of the clamp, respectively, which represent the space where the slide lock 306 is to be located. The apertures have a width that approximates the width of the slide lock 306.

FIG. 8 is a close up view of the hook portion or hook 308 of the third design of a clamp. The hook 308 contains an opening 309 that will bend and partially open to allow the hook to be secured to a light string or other decoration. After sliding the light string through the opening 309 (opened by applying pressure to an end 326 of the hook), the opening will close into a rest position because of the memory of the hook 308. Alternatively a portion of the decorative item (e.g., a light string) can just be slid into the round opening created by the hook 308.

Figure 9:
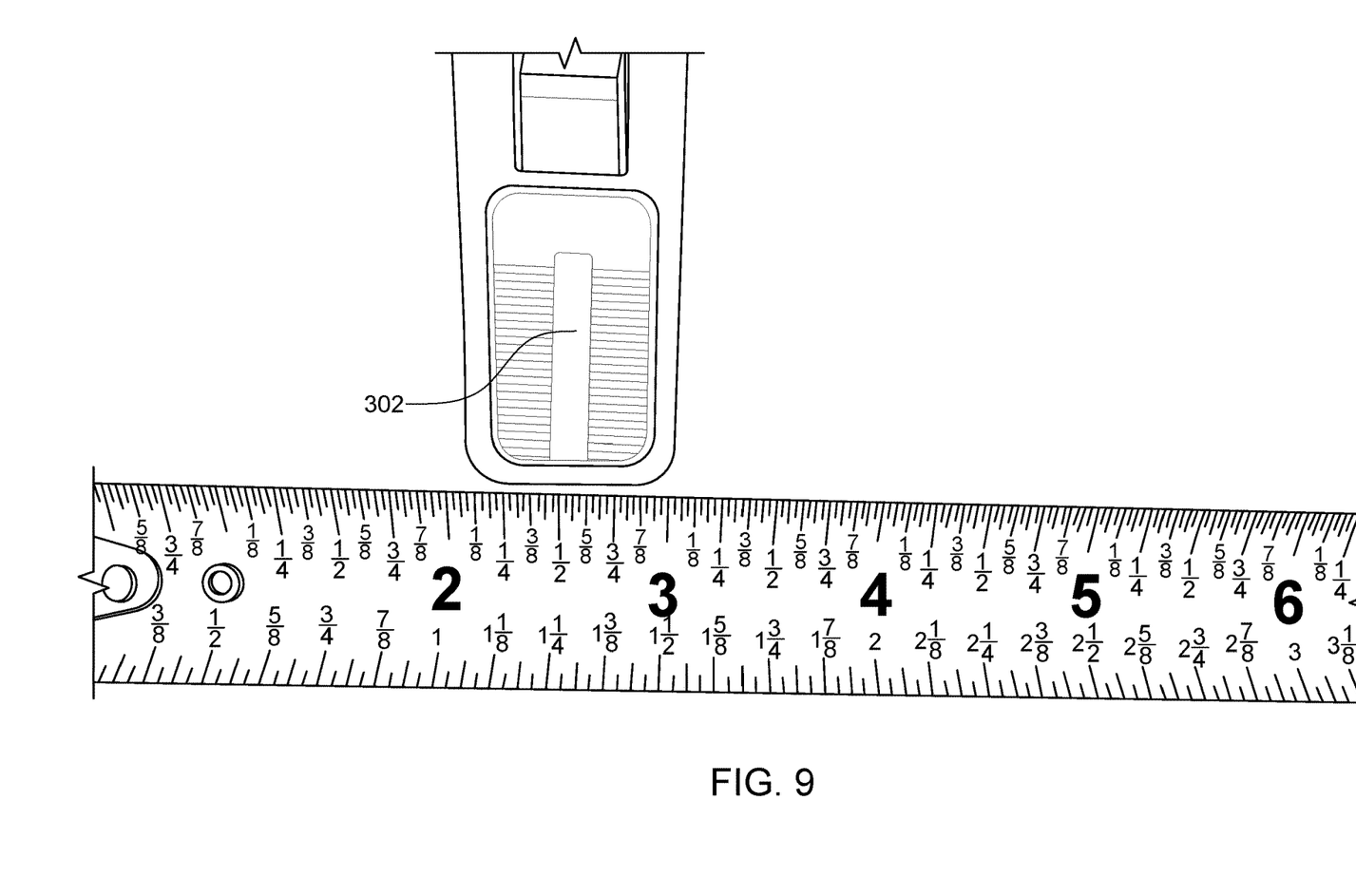
FIG. 9 is a top view of the clamp portion of the third design of a shingle clamp.

FIG. 9 is a top view of the clamp portion of the third design of a shingle clamp. In the depicted design, the top part 302 has a width of approximately 2.75 inches.

Figure 10:
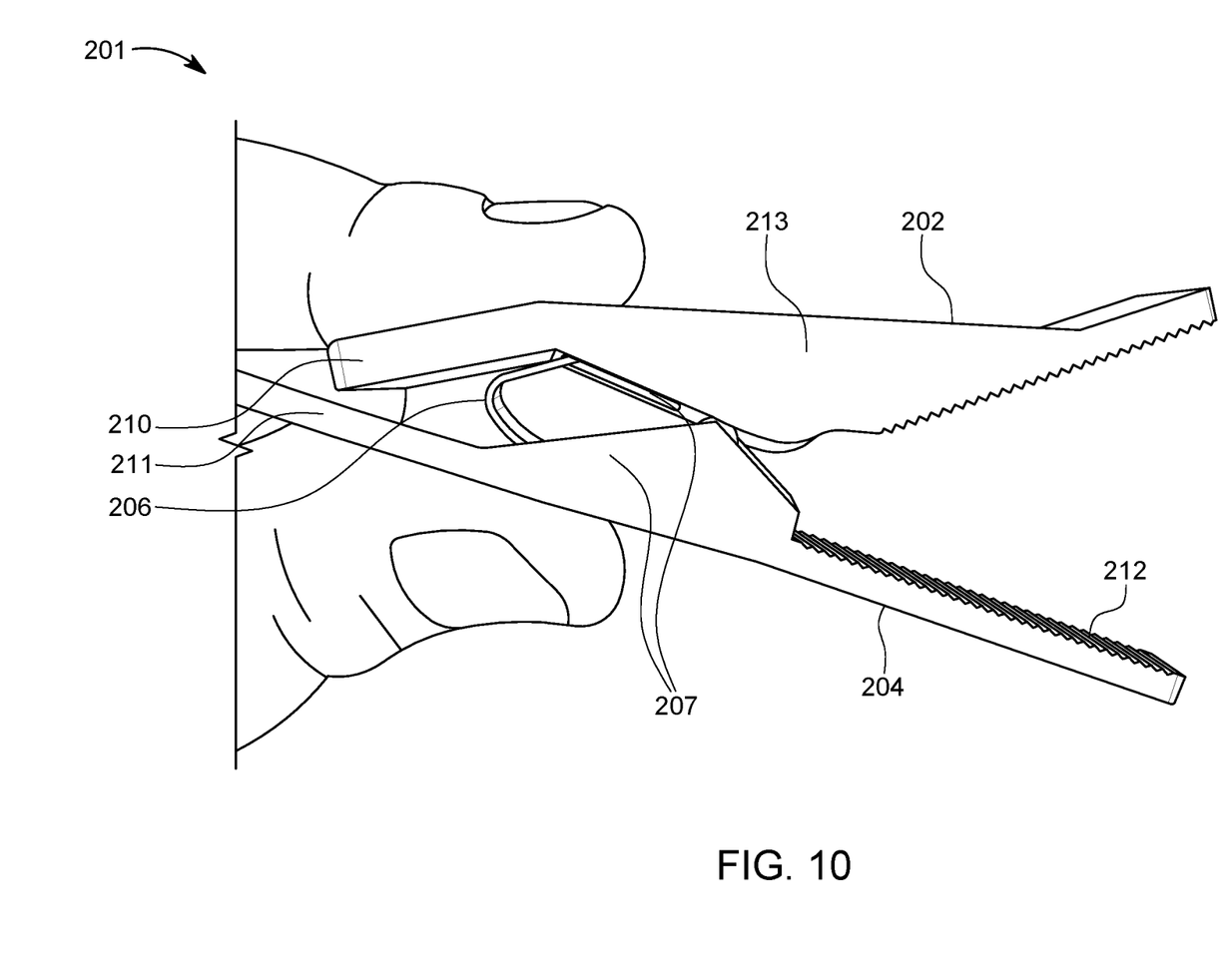
FIG. 10 is a view of the clamp portion of the second design of a shingle clamp being fully depressed.

FIG. 10 is a view of the clamp portion 201 of the second design of a clamp being fully depressed. As can be seen, the user presses both the top press part 210 and bottom press part 211 to cause the clamp opening 212 to open. When a user applies pressure to press parts 210/211, the arms 207 of the metal spring 206 expand outward. Since the plastic of this particular design is clear, in addition to one of the arms 207, one can view one of the bent tips 213 of the visible arm 207.

Figure 11:
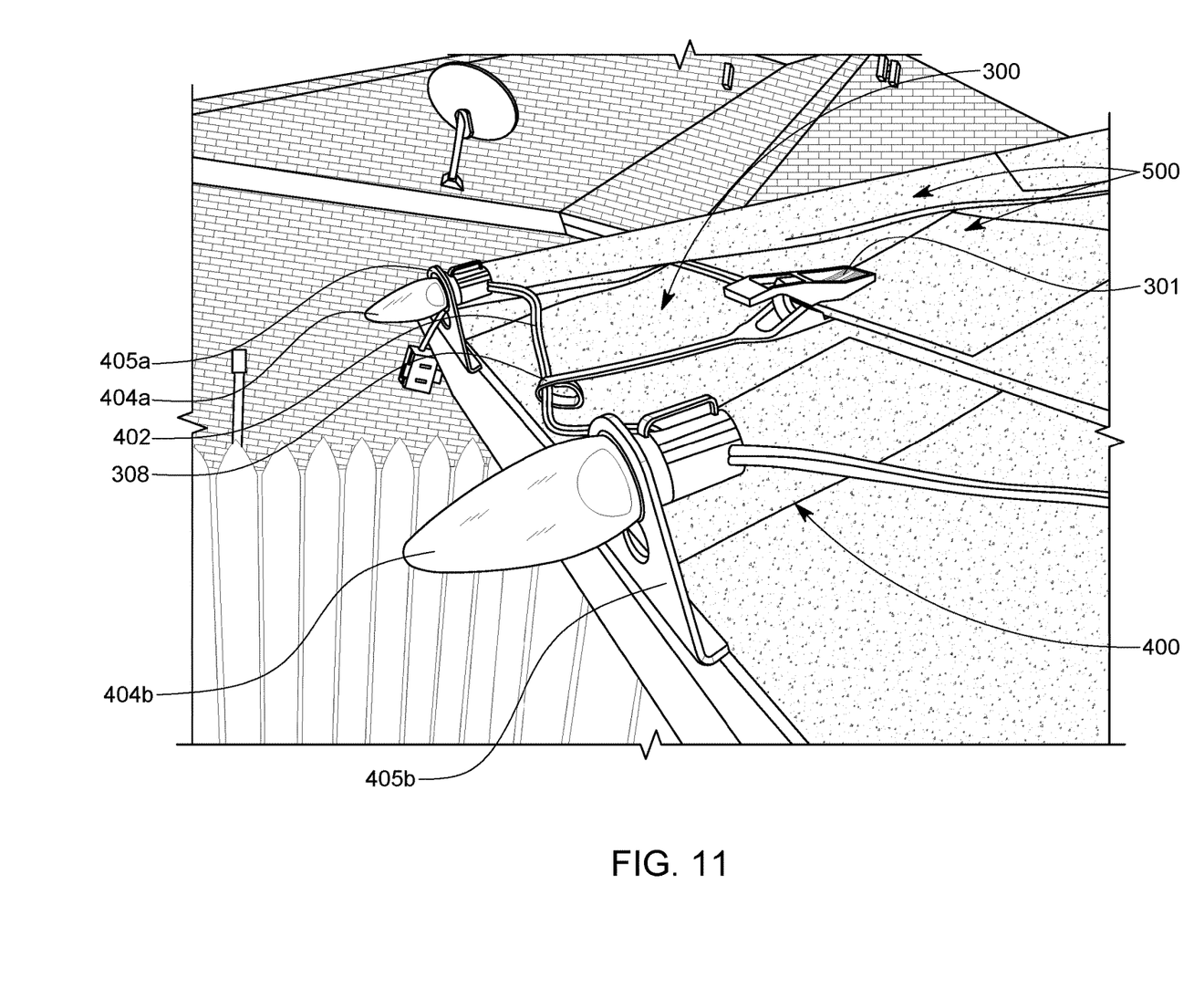
FIG. 11 depicts the third design of a shingle clamp attached to a roof shingle while securing a string of lights.
Figure 12:
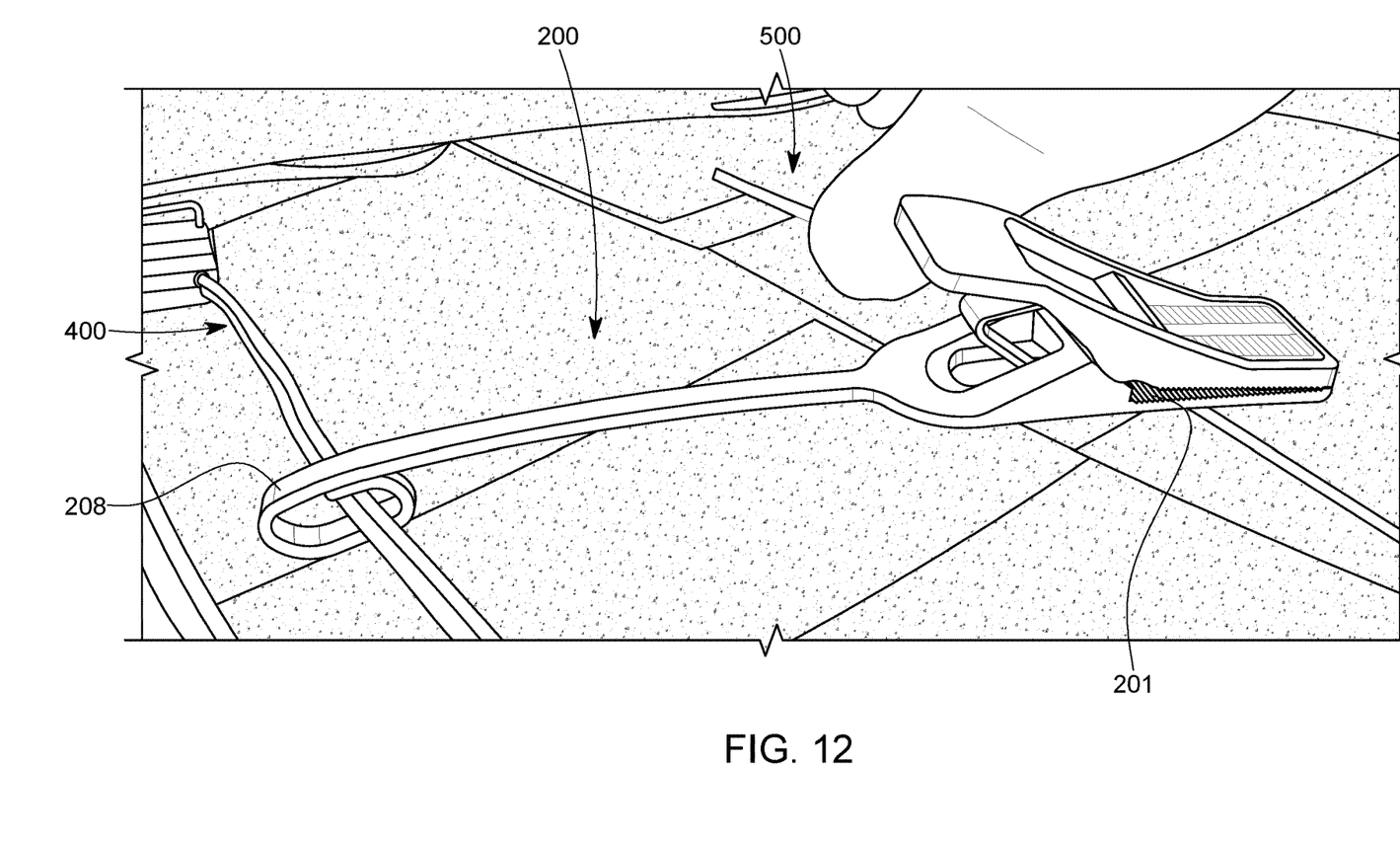
FIG. 12 depicts the second design of a shingle clamp just prior to it being secured to a roof shingle.

FIG. 11 depicts the third design of the shingle clamp attached to a roof shingle 500 while securing a string of lights 402. Shown are lights 404a/404b on a roof 400 made up of several shingles 500. The lights are already secured by a bracket 405a/405b for each light. The Shingle Clamp 300 provides an additional measure of security especially during inclement weather such as strong wind. In FIG. 12, light string 402 is secured by the hook 308 while the clamp portion 301 of the clamp 300 is secured to a shingle 500.

FIG. 12 depicts the second design of the shingle clamp just prior to the clamp portion 201 being clamped to a roof shingle 500. In FIG. 13, the light string 400 has already been placed within the hook portion 208.

The Shingle Clamp can be manufactured in any number of ways, including injection molding and 3D printing. The Shingle Clamp keeps decorations secure on windy days and during inclement weather (such as hail, ice or sleet). The versatility of the design allows the Shingle Clamp to attach to a variety of fixtures that are not shingles.

Even though the invention is entitled "The Shingle Clamp" the clamp can secure decorations to any type of surface, including roofs, ceilings, and shingles.

While the invention has been described with particular reference to specific embodiments, it will be apparent to those skilled in the art that the same principles may be used in similar arrangements. The invention is not limited to the precise structures described. Various changes and modifications may be made without departing from the spirit and scope of the invention as defined by the claims below. For example, steps of a process can be in any order, unless the context clearly indicates otherwise.

What is claimed is:

1. A device for securing a decorative item to a shingle roof, comprising:
   an elongated rod having a distal end and a proximal end;
   a clamp having a pair of opposed jaws constructed to grip a roof shingle on both top and bottom surfaces of the shingle, one of the pair of jaws rigidly attached to the proximal end of the elongated rod, the clamp having an arcuate spring or slide lock coupled to the jaws constructed to bias the clamp closed with a force tending to directly push the jaws together;
   the arcuate spring or slide lock having bent tips (213/313) to secure the arcuate spring or slide lock to the jaws;
   the distal end of the elongated rod being bent to form a hook constructed to act independently of the clamp, the hook biased to form a closed loop in a resting state constructed to hold an item; the hook adapted to allow release of the item in an engaged state.

2. The device of claim 1 wherein the clamp is a squeeze clamp.

3. The device of claim 2 wherein the squeeze clamp is plastic with a metal spring.

4. The device of claim 2 wherein the squeeze clamp is plastic with a plastic spring.

5. The device of claim 1 wherein the elongated rod and hook are plastic.

6. The device of claim 1 wherein the elongated rod and hook are metal.

7. The device of claim 1 further comprising in combination a decorative item held within the hook of said device, wherein the decorative item is a light string.

8. The device of claim 1 further comprising in combination a decorative item held within the hook of said device, wherein the decorative item is a Christmas decoration.

9. A clamping device for securing a decorative item to two sides of a roof shingle, the clamping device comprising
   an elongated rod with a squeeze clamp on a first end and a closed loop on a second end;
   the squeeze clamp adapted to grip the roof shingle on both a top and bottom surface of the shingle,
   the squeeze clamp having two opposing jaws with a bias spring between them exerting force directly on the jaws that tends to close the jaws; the bias spring having bent tips (213) to secure the spring to the jaws
   the closed loop adapted to partially open in a non-relaxed state to allow attachment to an item, the closed loop being biased closed in a relaxed state to hold the item.

10. The device of claim 9 wherein the squeeze clamp is plastic with a metal spring.

11. The device of claim 9 wherein the squeeze clamp is plastic with a plastic spring.

12. The device of claim 9 wherein the elongated rod and closed_loop are plastic.

13. The clamping device of claim 9 further comprising in combination a decorative item held within the loop of said device, wherein the decorative item is a Christmas decoration.

14. The clamping device of claim 9 further comprising in combination a decorative item held within the loop of said device, wherein the decorative item is a light string.

\* \* \* \* \*